United States Patent [19]

Kressin

[11] 3,988,011
[45] Oct. 26, 1976

[54] FOOD PROCESSING APPARATUS

[75] Inventor: Wayne F. Kressin, Watertown, Wis.

[73] Assignee: Kusel Equipment Company, Watertown, Wis.

[22] Filed: Sept. 18, 1975

[21] Appl. No.: 614,554

[52] U.S. Cl. .................................. 259/104; 99/462
[51] Int. Cl.² ........................ B01F 7/00; B29B 1/10; A01J 15/02
[58] Field of Search ............ 99/456, 458, 459, 460, 99/461, 462, 463; 259/102, 103, 104, 116, 118, 119

[56] References Cited
UNITED STATES PATENTS

| | | | |
|---|---|---|---|
| 116,855 | 7/1871 | Monfort | 99/461 X |
| 881,781 | 3/1908 | Eastman | 99/459 |
| 1,200,250 | 10/1916 | Sinding et al. | 259/118 |
| 2,814,114 | 11/1957 | Nessler et al. | 99/463 X |
| 3,215,410 | 11/1965 | McMaster et al. | 259/104 |
| 3,541,687 | 11/1970 | Peters | 99/459 X |
| 3,858,855 | 1/1975 | Hazen | 259/104 |

Primary Examiner—Leonard D. Christian
Assistant Examiner—Robert T. Pous
Attorney, Agent, or Firm—James E. Nilles

[57] ABSTRACT

A food processing vat used to make cheese comprising a covered heated vessel that includes a pair of partially cylindrical intersecting portions forming a chamber having a figure-8 configuration and an improved means for cutting and agitating the food product received in the vat. The means for cutting and agitating comprises a plurality of curved vertically extending blades which are rigidly mounted on a frame which rotates within each cylindrical portion of the vat. The frames are secured to rotatable central shafts disposed centrally within each of the cylindrical portions, and the shafts and frames are rotated simultaneously and in such a pattern that curds and whey formed in the vat are completely stirred and uniformly agitated.

9 Claims, 6 Drawing Figures

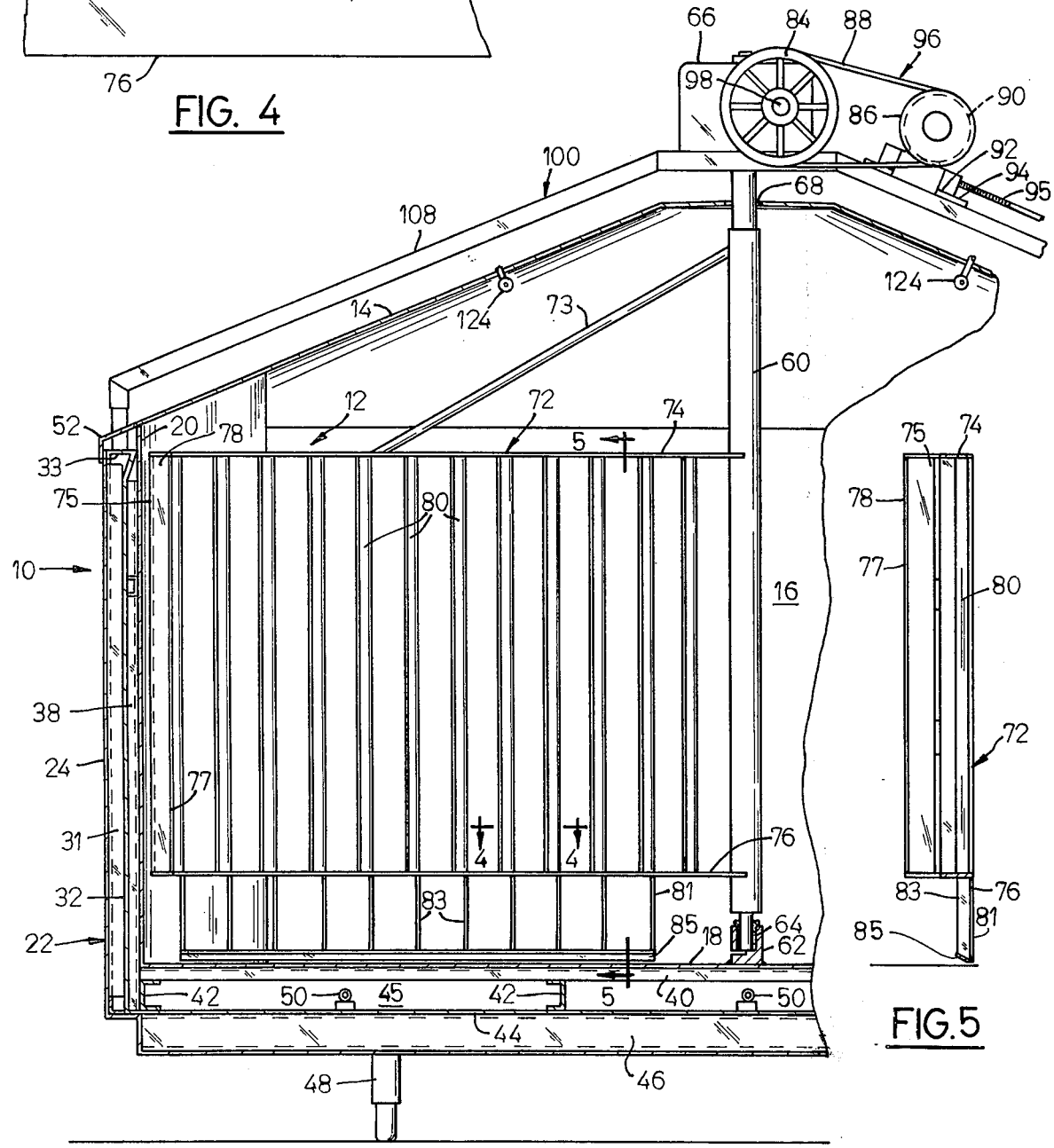

FOOD PROCESSING APPARATUS

BACKGROUND OF THE INVENTION

The present invention relates to a closed cheese making vat including means for cutting and agitating the curds formed in the vat during the cheese making process. Such vats are shown by way of example in the patent to Hazen, U.S. Pat. No. 3,858,855, issued Jan. 7, 1975. Such apparatus generally comprise a vat for receiving milk along with various additives which will cause the milk to curdle. The vats include means for heating and stirring the milk and additives until curds are formed and means to cut the curds into small pieces to facilitate separation of the curds and whey. During a cheese making process using this type of apparatus, following the cutting step, the curds are allowed to precipitate out of the whey so that a portion of the whey can be drawn off. It is then necessary to agitate the remaining whey and curd slurry until the completion of the process when the slurry may be removed from the tank for further processing.

Some of the prior art apparatus, such as that shown in the patent to Hazen have sought to provide a single means for performing both the cutting operation and the agitating operation. Using a single means for cutting and agitating is advantageous, however, such prior art apparatus have been unduly complicated. For example, in the apparatus disclosed in the Hazen patent the cutting and agitating means shown therein require a drive mechanism which will first rotate the cutting and agitating means in one direction to perform the curd cutting operation and then rotate them in the opposite direction for agitating the curd and whey solution or slurry. Such prior art apparatus also show the cutting and agitating means as having hinged or pivotable parts which were immersible in the curd and whey solution. After each use of the vats it is necessary to spray the vats with a cleaning solution to remove any residue left in the vat which could contaminate the subsequent batch. The use of the hinged or pivotable parts has the disadvantage that the pivot joints can collect residue and substantially increase the difficulty involved in cleaning the apparatus.

SUMMARY OF THE INVENTION

The present invention includes improvements in cheese making vats, such as that shown by the disclosure of the Hazen patent, simplifying the structure of such apparatus and improving the operating characteristics thereof. More specifically, the invention includes an improved means for cutting and agitating the curd and whey slurry including a plurality of curved blades which function to first cut the curds into small pieces and also function to agitate the resulting curds and whey slurry. The apparatus of the invention also includes means to insure a uniform distribution of heat throughout the slurry and to prevent a buildup of residue on the interior walls of the vat. Furthermore, the invention includes improvements which facilitate cleaning of the vats to insure the removal of any potential contaminants after each cycle of operation of the vat.

The cheese processing vat of the invention includes a vessel having a figure-8 shape and a cover over the vessel to preclude contaminants. The vessel is defined by a pair of cylindrical chambers adjacent to each other and in communication to permit flow of the curd and whey slurry received therein from one of the cylindrical chambers to the other. Each of the cylindrical chambers houses a centrally disposed vertically extending rotatable shaft which supports a blade supporting frame. The blade supporting frame extends from the shaft to the walls of the cylindrical chamber and is rotatable with the central shaft. The frames support a plurality of spaced vertically extending blades which are each curved and which are specifically shaped to both cut and agitate the food product within the vessel when the supporting frames are rotated about the central shaft. A drive means is connected to each of the shafts such that the shafts and the frame members are rotated simultaneously in a predetermined relationship with respect to each other. The drive means is mounted upon a frame structure above the cover and straddling the walls of the vessel.

The curved blades employed by the present invention to both cut and agitate the slurry are shaped such that when the frames are rotated relatively slowly, the blades can cut the curd and later when the frames are rotated at increased revolutions they will function to create turbulence in the solution to agitate it. By providing the curved shape to the blades it is thus possible to perform both the cutting and the agitating operation while revolving the frame in only one direction. By providing means which facilitate both cutting and agitation by rotation of the frames in only one direction the complexity of the means for driving the frame structure can be substantially reduced, and the use of hinged or pivoting elements, can be avoided.

The present invention also provides foils attached to the radial outer end of each of the frame structures and to the bottoms of the frames in order to create turbulence in the food product adjacent to the walls of the vessel. The particular shape of the foil attached to the frame prevents the food product from adhering to the walls as it is being processed and heated and thereby prevents a buildup of undesirable residue on the vessel walls. This improvement greatly facilitates cleaning of the vessel following the cheese processing step. The turbulence created by the foil also enhances the even distribution of heat from the walls of the vat into the food product to improve the quality of the final product of the operation.

BRIEF DESCRIPTION OF THE DRAWINGS

FIG. 3 is a partial cross-section view taken generally along line 3—3 in FIG. 2;

FIG. 4 is an enlarged cross-section view taken along line 4—4 in FIG. 3;

FIG. 5 is a cross-sectional view taken along line 5—5 in FIG. 3;

DESCRIPTION OF THE PREFERRED EMBODIMENT

Figure 1:
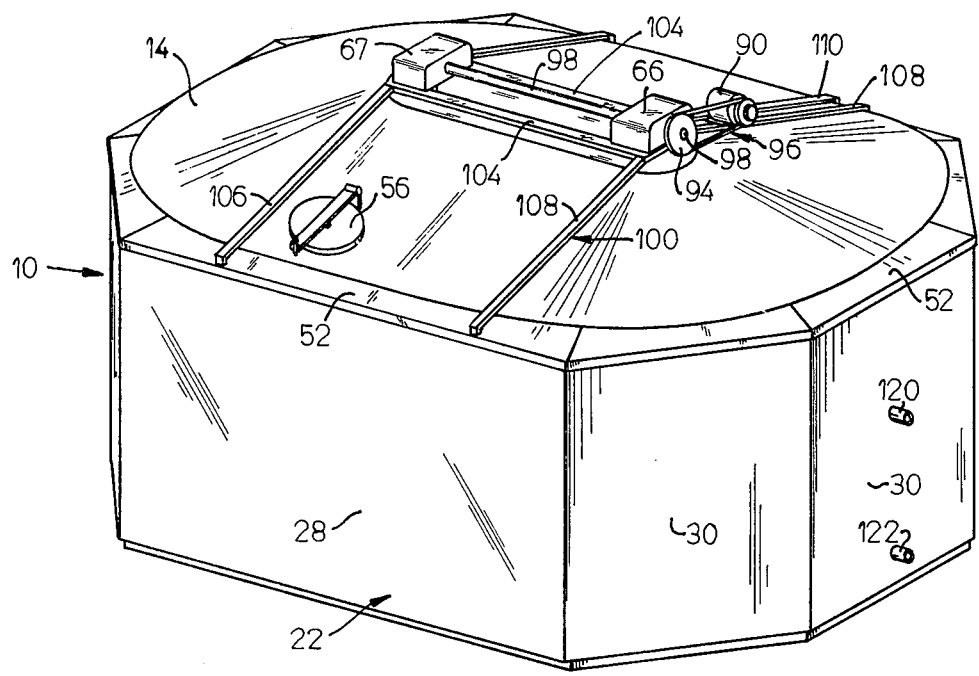
FIG. 1 is an isometric view of the food processing vat of the present invention.

The present invention is directed to a food processing vat 10 used for making various types of cheese. The vat 10 includes an inner shell 12 which is open at the top and which defines a vessel having a figure-8 configuration designed to receive milk and the other food products comprising the necessary elements used to make cheese. The inner shell 12 is comprised of a vertical side wall 20 and a flat bottom wall 18 which may be made of corrosion resistant material such as stainless steel. The vat 10 also includes a cover 14 welded to the top of the inner shell 12 to preclude contaminants. The figure-8 shape of the inner open shell 12 can be more specifically described as being defined by a pair of intersecting partially cylindrical chambers 16 joined together at a waist of reduced width and in communication with each other to permit flow of the food product from one of the partially cylindrical chambers 16 to the other.

Figure 2:
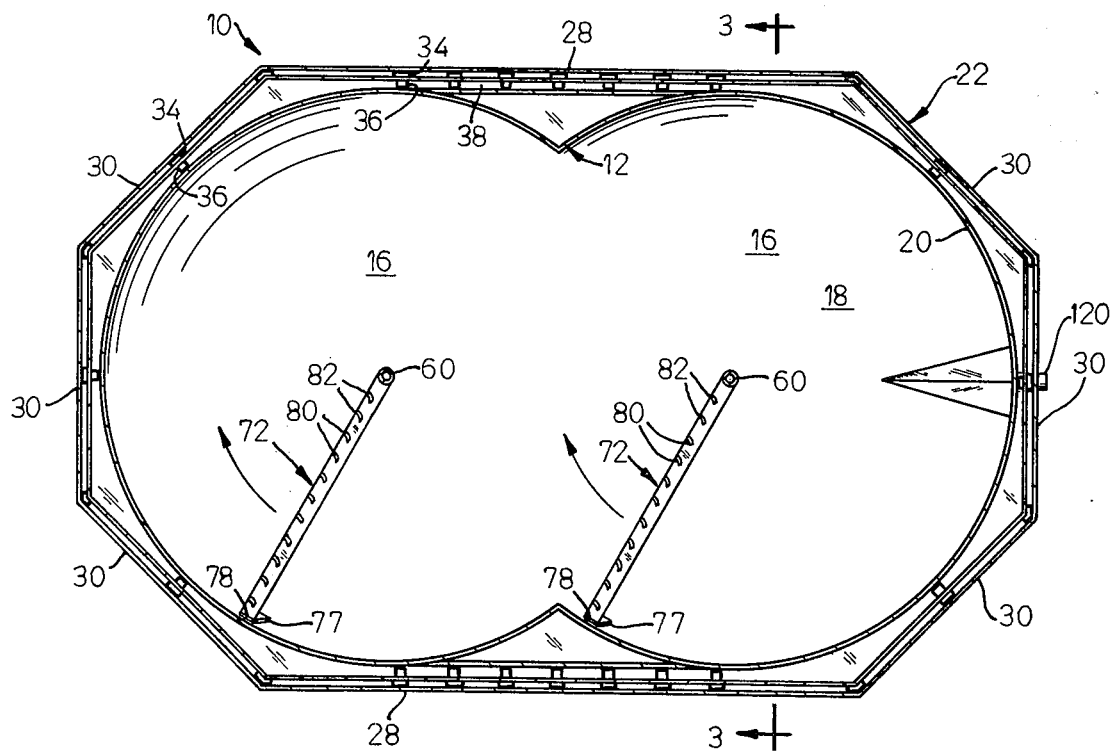
FIG. 2 is a top cross-sectional plan view of the vat shown in FIG. 1.
Figure 6:
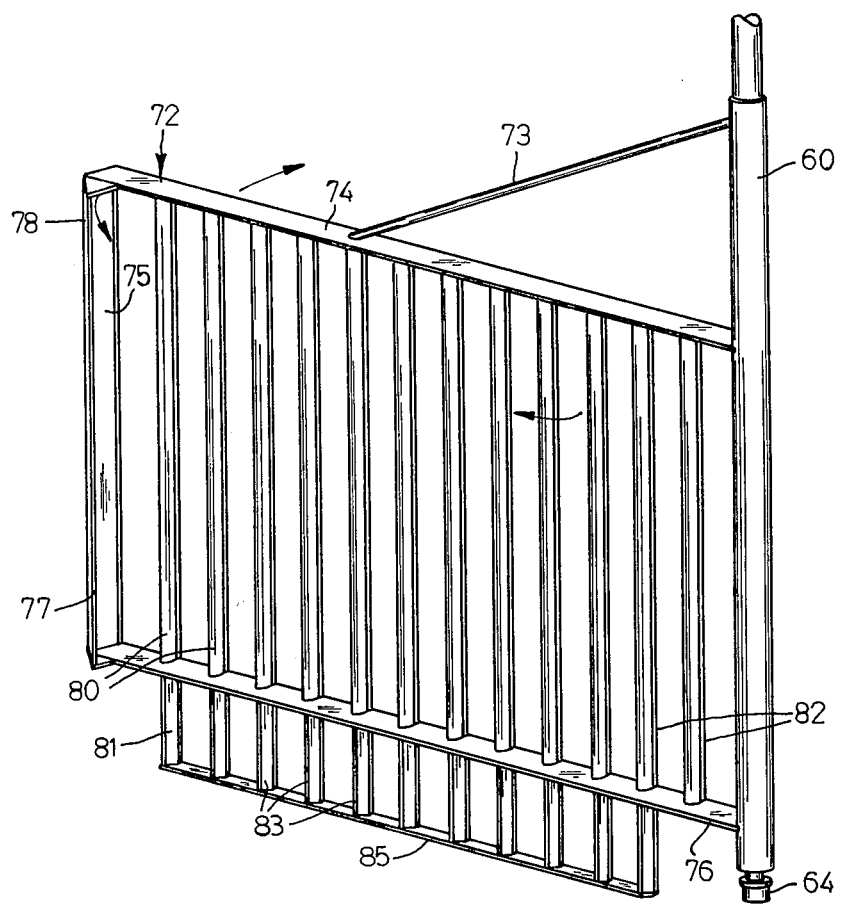
FIG. 6 is an isometric view of the frame structure and cutting blades of the present invention.

As best shown in FIGS. 2 and 3, the inner shell 12 of the vat 10 is surrounded by an outer octagonal jacket 22 which is also formed of a corrosion resistant material such as stainless steel. The outer octagonal jacket 22 is comprised of a vertical wall 24, which is spaced outwardly from the vertical walls 20. The outer vertical wall 24 is shaped to include generally straight parallel elongated wall sections 28 extending along either side of the vat 10 and joined at their ends by three angular wall sections 30. The inner shell 12 and the outer vertical walls 24 define a space 31 which houses an interior wall 32 which is secured to both of the walls 24 and shell 12 by angular brackets 34 and 36. As shown in FIG. 2, a generally fluid tight space 38 is formed between the inner shell 12 and the interior wall 32 for receiving steam which is used to heat the food product received within the inner shell 12. The interior wall 32 includes at its upper end an angular portion 33 extending across the width of the space 31 near the top of the interior and outer walls to define an upper wall of the space 38.

As shown in FIG. 3, the inner shell 12 is supported on a plurality of supporting channels 40 which extend across the width of the shell and which are in turn supported on a plurality of supporting channels 42 which which are in turn supported on a plurality of supporting channels 42 which extend the length of the vat 10. The supporting channels 42 rest upon a bottom plate 44 which is in turn supported by three box beams 46. The box beams 46 are each mounted on a pair of adjustable legs 48. The space formed between the bottom plate 44 and the bottom wall 18 defines a steam chamber 45 which is in communication with the vertical space 38. In order to provide a readily controlled heat source to the vat 10, steam pipes 50 extend beneath the bottom wall 18 of the inner shell 12 and are located within the steam chamber 45 defined by that bottom wall and the bottom plate 44. Each of the steam pipes 50 is provided with a plurality of small holes therein to permit steam to pass through the holes and into the chamber 45. As stated, the space 38 is in communication with chamber 45 so that steam may readily flow from the steam chamber 45 into the space 38 to provide heating of the vertical walls 20.

The tent shaped cover 14 which is received over the inner shell 12 is continuously welded around its periphery to the upper portion of the inner shell 12. A transition plate 52 surrounds the periphery of the inner shell 12 and the cover 14 and joins them to the outer octagonal jacket 22. The cover 14 is provided to prevent contaminants from entering the vessel during the cheese making operation and to facilitate automatic cleaning of the interior of the vessel as will be described hereafter.

A manhole 56 is provided in the cover 14 to permit access to the interior of the vat 10 for repair or maintenance purposes and to permit additives such as rennet or starter to be added to the milk in the vat 10. The manhole 56 is provided with a pivotable manhole cover which may be securely engaged to close the manhole. The cover 14 also includes a pair of spaced holes 68 which receive vertically extending rotatable shafts 60.

The vertical shafts 60 are disposed within the center of each of the partially cylindrical intersecting chambers 16 and are each rotatably supported at their lower ends by a collar 62 which includes a nylon bushing 64 therein. The shafts 60 are freely rotatable within the nylon bushings 64, and are received at their upper ends in gear boxes 66 and 67 in such a manner that they may be driven in a manner to be described. Each of the vertical shafts 60 supports a frame structure 72 which in turn support a plurality of spaced vertically extending cutting and agitating blades 80. The frame structure 72 comprises a pair of vertically spaced horizontally extending supporting bars 74 and 76 which are integrally attached to the shaft 60 by welding, for example. The frame structures 72 extend radially outwardly from the shaft 60 toward the inside surface of the inner shell 12 and are designed to rotate with the shaft 60. The supporting bars are of a length which is slightly less than the radius of the cylindrical chambers 16 such that during rotation, the radial outer end of the frame structure 72 traverses a path adjacent to the inner surface of the inner shell 12 but not scraping it. The frame structure 72 is supported from the shaft 60 by a supporting rod 23 welded at one end to the upper bar 74 and welded at the other end to the vertical shaft 60.

As stated, a plurality of spaced vertically extending blades 80 are welded between the upper and lower bars 75 and 76 so as to rotate with the frame structure during its rotation. The blades 80 are provided with a straight, vertically extending somewhat sharpened leading edge 82, and as best shown in FIG. 4 are generally curved around a vertical axis. During the initial stages of the cheese making process, the milk and additives within the vat are heated until curds form. The sharpened leading edge 82 of the blades 80 is provided for cutting the curd formed into relatively small pieces. As the processing continues, the curds formed tend to become more solid and less easy to cut. In order to prevent continued cutting of the curds the sharpened edge of the blades has a radius on the order of 1/32 inch so that it is somewhat dull and will not cut through the curds after the curds become relatively solid. During the remainder of the processing cycle it is necessary to maintain a uniform agitation of the curd and whey slurry which forms. In order to provide for such agitation, as best shown in FIG. 4 each of the blades 80 is curved around a vertical axis so as to present a concave surface facing the direction of rotation of the frame and a convex surface facing the other direction. When viewed in a generally horizontal plane, the curve of the blades can be seen as defining an arc of approximately 70°. By providing the blade 80 with a curved configuration as shown, during rotation of the frame 72 through the generally liquid curd and whey slurry, each of the blades will create turbulence and will function to yield the desired agitating effect. The blades are spaced sufficiently far apart and are relatively narrow in width so as to permit the flow of material between them to avoid unnecessary drag.

By using blades having the shape of those of the present invention it is thus possible by merely changing the speed of rotation of the blades to cut the curd and then agitate the whey and curd slurry without changing the direction of rotation of the blades or without the substitution of additional or alternate apparatus. Since the frame member and the shaft 60 need only be rotated in one direction the complexity of the drive mechanism required is greatly reduced. Furthermore, it is also possible by using the curved blades to avoid the necessity of any pivotable or movable parts being attached to the frame structure. Such pivotable or movable elements as have been used in the prior art have the disadvantage that the joints which permit pivotable motion are difficult to clean following the cheese making process. Eliminating such pivot pins or joints facilitates cleaning of the vat and prevents the possibility of contamination of the cheese.

The radially outer end of the frame structure 72 is provided with a foil 78 which is designed to create turbulence along the edges of the inner shell 12 as the frame structure rotates. The foil 78 is welded at opposite ends to the upper horizontal bar 74 and the lower horizontal bar 76 and includes a trailing portion 77 which forms an angle of approximately 45° with the inside surface of the side wall 20. As the frame structure 72 rotates, the trailing portion 77 of the foil 78 will create a turbulence adjacent to the side wall 20. By creating such turbulence, the heat emanating from the wall 20 due to the steam in the chamber 38 can be more evenly distributed throughout the food product. The turbulence also functions to avoid any buildup of residue material against the side wall 20 thereby facilitating easier cleaning.

A similar concept is also employed to maintain agitation along the bottom wall 18 of the vat 10. A frame extension 81 projects vertically downwardly and includes a plurality of vertically extending straight blades 83, secured in spaced relation between the lower bar 76 and a bottom bar 85. During rotation of the frame 72 the bottom bar 85 passes in close relation to the bottom wall 18 and at an angle of approximately 45° to the bottom wall, thereby creating turbulence, agitating the liquid near the bottom wall and preventing any buildup of residue on the wall. The leading edge of the bottom bar is ground to have a generally sharpened edge.

The shafts 60 are driven in synchronization by an electric motor 90 which is mounted on a frame work 92 and which is operably connected to the gear boxes 66 and 67 by a variable speed pulley drive mechanism 96 and by a connecting drive shaft 98. The motor 90 and gear boxes 66 and 67 are mounted upon a frame structure 100 which includes a pair of beams 106 and 108 straddling the width of the vat 10. The pair of beams 106 and 108 are in turn supported by a pair of beams 104 extending between them. The motor 90 is mounted on a slideable carriage 94 which is slideably supported on track 110 and on beam 108 for movement toward or away from the gear box 66. A crank operated screw 95 is rotatably journalled at one end and threadably received through the slideable carriage 94 at its other end such that rotation of the crank will facilitate manual movement of the electric motor 90 and carriage 94 toward or away from the gear box 66. The connecting drive shaft 98 extending through the gear box includes a pulley 84 secured to its end. The motor 90 includes a variable speed pulley 86 in alignment with the pulley 84 for receiving a belt 88. Movement of the motor 90 on the slideable carriage and the consequent movement of the variable speed pulley 86 toward or away from the opposed pulley 84 will cause a variance in the speed of rotation of the drive shaft 98 such that the speed of rotation of the shafts 60 will also be varied.

In order to permit the withdrawal of excess whey during the cheese making process and to permit removal of the food product from the vat for further processing the vat includes a pair of vertically spaced outlets 120 and 122 at one of its ends. The outlets are on the order of 4 inches in diameter and include sanitary fittings (not shown) to which a valve can be attached. Outlet 120 is located approximately mid-way up the vertical wall. During the cheese making process, after the curds have been cut into small pieces by the blades 80, the whey will separate from the curds, and the curds will precipitate out of the resulting slurry and settle toward the bottom of the vat. An excess portion of the whey can then be drained off through the upper port 120. The lower port 122 permits the final product produced in the vat comprising a slurry of whey and curds to be pumped out of the vat for further processing. In order to permit a complete drainage of the vat, the bottom wall 18 has a "V" type outlet and the vat opposite the ports 120 and 122 is slightly raised by approximately 3 inches such that it will slope toward the port 122.

After the product of the cheese making process has been pumped out of the vat, it is necessary to wash the interior of the vat to remove any residue which might contaminate the next batch produced. A pair of nozzles 124 extend downwardly from the cover 14 into the vat to permit a washing solution to be sprayed under pressure against all of the interior parts of the vat. Since the cover 14 prevents the escape of any of the spray, the washing solution used can include very caustic elements to insure that the vat is thoroughly cleaned.

RESUME

The apparatus of the invention described herein thus sets forth an improved means for processing a curd and whey solution formed during the cheese making process. By employing blades having the particular shape of those described herein is possible to first cut the curds and then agitate the curd and whey solution without changing the direction or rotation of the blades. The invention also prevents means for maintaining a turbulence in the solution and adjacent to the walls of the vat to prevent buildup of residue on the walls and to maintain uniform heat distribution throughout the solution. The structure of the apparatus specifically avoids the use of joints of hinged members thereby facilitating the cleaning of the apparatus after the cheese making process has been completed and precludes the possibility of contaminants interfering with a subsequent process.

I claim as my invention:

1. A cheese making vat for receiving a food product and for use in making curds and a curd and whey slurry the vat including a rotating cutting and agitating means for cutting the curds and for agitating the curd and whey slurry formed in the vat, said rotating cutting and agitating means including a plurality of vertically extending and spaced apart curved blades moveable through the curds and the curd and whey slurry, said blades being curved when viewed in a generally horizontal plane, the cutting blades each have a leading edge sharpened for cutting the curds and a body portion in trailing relationship to the cutting edge with respect to the direction of movement of the blades, the body portion being curved whereby the blade causes agitation of the slurry when moved through the slurry.

2. The cheese making vat set forth in claim 1, wherein said vat has an inner wall and includes means for rotatably supporting said cutting and agitating means for rotational movement about a vertical axis such that said cutting and agitating means extends radially outwardly from said axis and wherein said cutting and agitating means includes an agitating member secured thereto at its radially outer end in trailing relationship with respect to the direction of rotation of the radially outer end whereby the food product located adjacent the inner wall of said vat is forcibly agitated as said agitating means rotates.

3. The cheese making vat set forth in claim 1, wherein said agitating means includes a supporting frame for rigidly supporting said spaced apart vertically extending curved blades in spaced relationship and a central shaft supporting said frame whereby said frame is rotatably mounted in said vat.

4. The cheese making vat set forth in claim 1, wherein said vat includes a bottom wall and means for rotatably supporting said cutting and agitating means for rotation about a vertical axis and wherein said cutting and agitating means includes a horizontal radially extending agitating member spaced from said bottom wall but adjacent thereto and disposed at an angle with respect to said bottom wall for agitating the food product adjacent said bottom wall as said agitating means rotates.

5. The cheese making vat set forth in claim 2, wherein said agitating member includes a trailing surface defining an acute angle with said inner wall.

6. The apparatus set forth in claim 1, wherein said vat includes a pair of adjacent partially cylindrical adjacent chambers defining a figure-8 configuration, said chambers each having a vertically extending axis and being in communication with each other to permit relatively free flow of said food product from one of said chambers to the other.

7. A cheese making apparatus comprising a vat for receiving a food product and for use in making curds and a curd and whey slurry, the vat including a rotating cutting and agitating means for cutting the curds and agitating the curd and whey slurry formed in the vat, said rotating means including a plurality of vertically extending curved blades, the blades each having a leading edge sharpened for cutting the curds and a body portion in trailing relationship to the cutting edge with respect to the direction of movement of the blades the body portion being curved whereby the blades cause agitation of the slurry when moved through the slurry, and a drive means for rotating said cutting and agitating means, said rotating cutting and agitating means further including vertical shaft means rotatably mounted within said vat, a blade supporting frame secured to said vertical shaft means for rotation therewith and extending radially outwardly from said shaft, said frame rigidly supporting said plurality of vertically extending curved blades in spaced relation whereby said blades may rotate for cutting and agitating said food product.

8. The apparatus set forth in claim 7 wherein said vat includes a pair of adjacent partially cylindrical adjacent chambers defining a figure-8 configuration, said chambers each having a vertically extending axis and being in communication with each other to permit relatively free flow of said food product from one of said chambers to the other.

9. The food processing apparatus set forth in claim 8, wherein a vertical shaft means is centrally positioned within each of said partially cylindrical chambers and rotatably supports a food product cutting and agitating means are rotatably driven in timed relation.

* * * * *